March 20, 1934. J. N. KALKANIS 1,951,872
CANDY MAKING MACHINERY
Filed Sept. 28, 1931 2 Sheets-Sheet 1
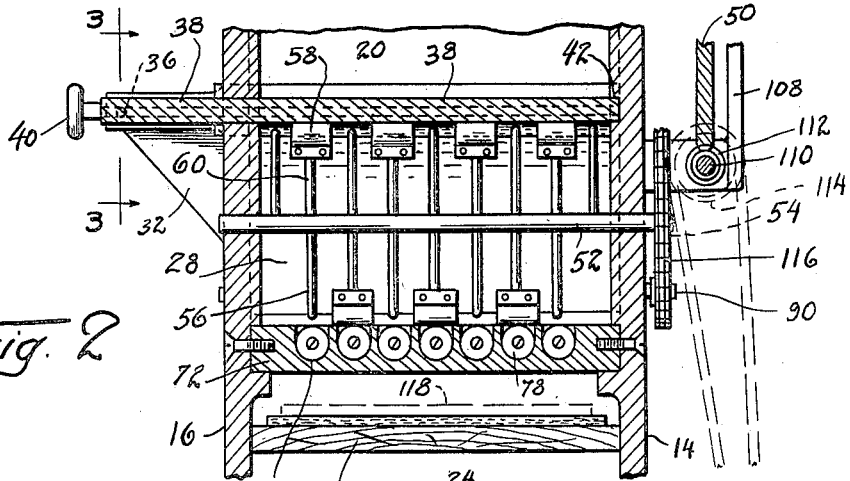
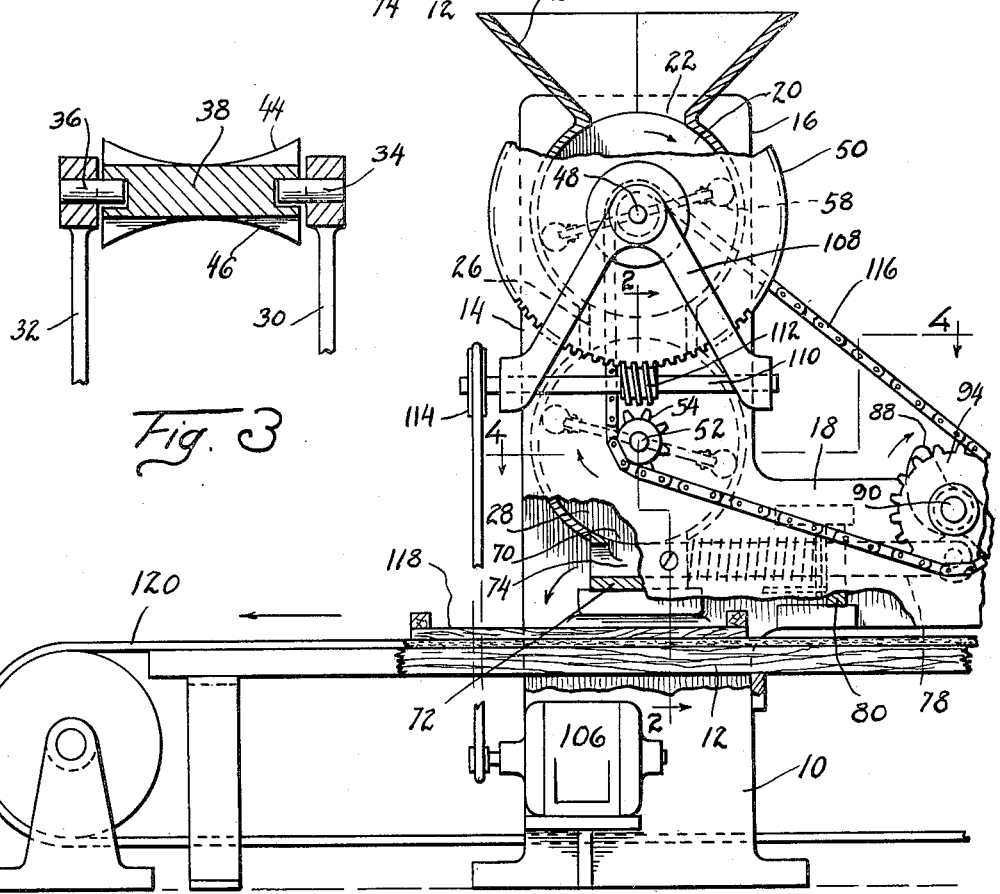
INVENTOR.
James N. Kalkanis
BY
ATTORNEYS.

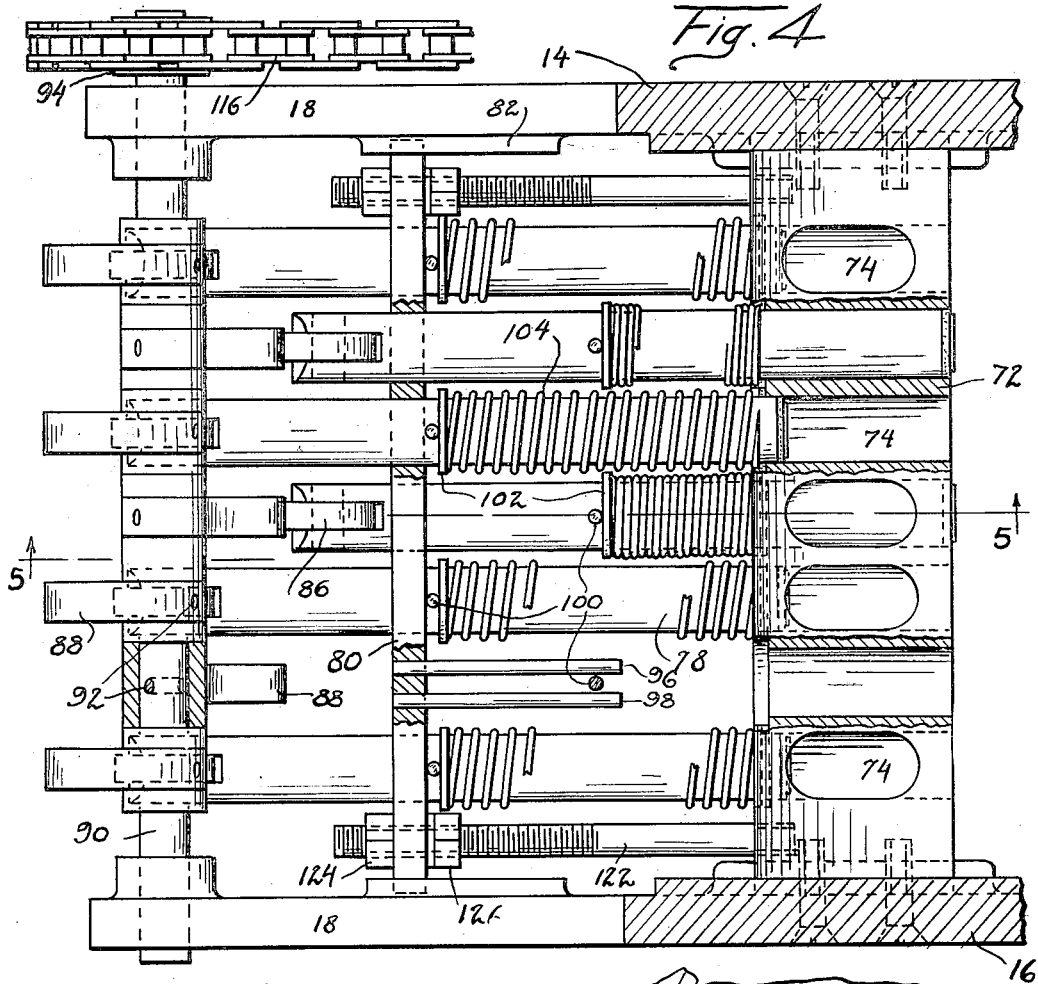
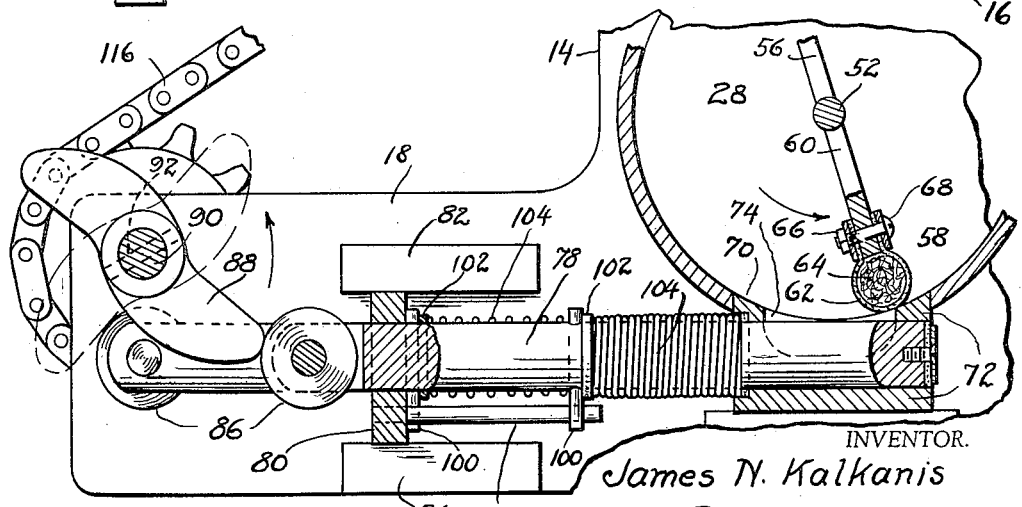
Fig. 4
Fig. 5

Patented Mar. 20, 1934

1,951,872

UNITED STATES PATENT OFFICE 1,951,872

CANDY MAKING MACHINERY

James N. Kalkanis, Detroit, Mich.

Application September 28, 1931, Serial No. 565,573

9 Claims. (Cl. 107—8)

My invention relates to the manufacture of confectionery and the like and has particular reference to a machine for mixing the various ingredients into the desired consistency and subsequently molding the substance into small units of any desired size.

An object of my invention is to simplify the molding of candy nut bars and the like and to insure thorough mixing of the various ingredients utilized in the candy. In so doing I have devised improved mechanism for mixing a batch of the substance successively in two separate and distinct operations, providing readily manipulated means for shifting the substance from the first mixing chamber into the second at such time as the substance approaches the consistency which is desired for the final molded product.

A further object of my invention is to insure a clean cut uniform molded product of any desired shape and for this purpose I have so arranged the molds that they may be regarded as a portion of the wall of the secondary mixing chamber and provided mechanism automatically operable for positively ejecting the substance from the mold after it has been deposited therein. This positive ejection means, in contradistinction to what may be regarded as a "cutting away" or "sweeping out" of the mold, insures a uniform product with clean cut edges, a characteristic which substantially enhances the salability and attractiveness of the finished product.

Another important feature, which is adapted to cooperate with the positive ejection means, resides in the arrangement of the agitating members which operate within the secondary mixing chamber. The movement of these units and that of the positive ejection members are so correlated as to further assist in securing a clean cut finished product from the mold.

Still a further object of the invention resides in the particular combination and arrangement of parts whereby the entire series of operations may be performed through the power provided by a single prime mover, as well as in the particular arrangement of the mixing chambers and the agitating units which operate to mix the ingredients into the desired consistency.

An important feature of the invention resides in the particular form of agitating units utilized whereby brittle ingredients such as nuts or the like may be efficiently stirred within the chamber without causing any substantial breakage or crumbling thereof.

Various other meritorious features of the invention will be apparent from the following description taken in conjunction with the drawings wherein:

Fig. 1 is a side elevation of the assembly, partly broken away for the sake of clearness, Fig. 2 is a section along 2—2 of Fig. 1, Fig. 3 is a section along 3—3 of Fig. 2, Fig. 4 is a section along 4—4 of Fig. 1, Fig. 5 is a section along 5—5 of Fig. 4.

Referring now to the drawings the assembly is supported upon a standard 10, which standard provides a central seating portion 12 extending thereacross, the two side walls 14 and 16 continuing upwardly to form supporting walls between which the mixing chambers and ejecting mechanism are supported. Each of the walls is extended horizontally as indicated at 18 to support the actuating members for the ejection elements. Between the side walls 14 and 16 adjacent the upper extremities thereof is positioned the primary mixing chamber 20 which is preferably of cylindrical form and provided with an opening 22 extending along the upper cylindrical wall thereof. A receiving chute 24 may be formed integrally with the mixing chamber or secured thereto in any desired manner for the reception of the ingredients which are to form the finished product.

The lower portion of the cylindrical wall of the primary mixing chamber 20 is cut away as indicated at 26 in Fig. 1 and immediately below this opening a communicating secondary mixing chamber 28, which may be likewise of cylindrical shape, is positioned between the side walls 14 and 16. A pair of brackets 30 and 32 extend outwardly in spaced apart relation from the wall 16 and are provided with inwardly extending pins 34 and 36 which provide a guide along which the longitudinally slotted edges of a partitioning element 38 are adapted to slide. The partitioning member is provided with a handle 40 at its outer extremity and is adapted to pass through an opening formed therefor in wall 16 between the brackets 30 and 32 to close the communicating passage between the two mixing chambers 20 and 28. The partitioning member is positioned at its inner extremity by means of a cut away portion 42 formed on the inside of the wall 14, as clearly illustrated in Fig. 2.

It is to be noted that the upper and lower faces 44 and 46 of the partitioning member 38 are concave so that the member is adapted to form a portion of the cylindrical wall of both the upper and lower mixing chambers. By reason of this concavity on each side it forms a true continuation of the inner cylindrical surface of each chamber when positioned as indicated in Fig. 2.

A plurality of agitating elements are secured or formed integrally with a shaft 48 which extends through the center of the upper mixing chamber 20 and is journalled in the walls 14 and 16. A gear wheel 50 is positioned upon the outer extremity of the shaft 48 for the purpose of rotating the latter, as will be described more clearly hereinafter.

A similar plurality of agitating elements are secured to or formed integrally with another shaft 52 extending through the center of the secondary mixing chamber 28 and journalled in the walls 14 and 16. One outer extremity of shaft 52 is provided with a pinion 54 whereby the said shaft and its agitating elements are rotated.

These agitating elements comprise an important feature of the invention and constitute a series of alined spaced apart paddle assemblies including what may be regarded as a stirring handle portion 56 positioned on one side of the supporting shaft and a wiping blade 58 positioned at the extremity of a second stirring portion 60, which latter extends in axial alinement with the the stirring portion 56 on the opposite side of its supporting shaft. The wiping blades 58 are secured to the stirring portions 60 of the assembly in any suitable manner and are adapted to wipe the inner walls of each of the respective mixing chambers. As clearly illustrated in Fig. 2 each alternate wiping blade 58 is positioned upon the opposite extremity of the agitating assembly and each of the units is in spaced apart relation, the spacing being such that the sides of the blades are in alinement. In this way the entire inner surface of each cylindrical mixing chamber is wiped during a single full rotation of the supporting shafts.

An important feature of the agitating assembly resides in the fact that the wiping blades are strong enough to withstand a substantial amount of resistance in the form of whatever semi-viscous or "gooey" substance is to be mixed by the agitating assembly, while at the same time they are pliant to a certain extent and capable of flexing so that any brittle substance which may be in the candy mixture will not be crumbled. In Fig. 5 I have illustrated a preferred form of wiper blade which comprises what may be regarded as a pocket structure 62 formed of some pliant material, such as leather, which is wrapped about a soft yielding substance 64 such as felt or cotton and secured to the extremity of the stirring portions 60 by means of the nut 66 extending through the ends of the packing material and secured in position by the bolt 68.

The lower portion of the mixing chamber 28 is provided with an opening 70 extending across the length thereof and immediately therebelow is positioned a mold block 72 which is provided at spaced apart intervals along its length with mold cavities 74 into which the agglomerate, after being stirred in the two mixing chambers, is adapted to settle. The mold block 72 may be positioned in any suitable manner. A plurality of plungers 78 are associated with each of the mold cavities 74 and adapted to eject, at defined intervals, the agglomerate which has been deposited therein. Each of the plungers extends through a guide sleeve formed in a guide block 80, which guide block is positioned between a pair of superposed bars 82 and 84 extending between the extensions 18 of the walls 14 and 16. Each plunger 78 is provided with a roller 86 journalled in the bifurcated outer extremity thereof, each of which rollers is adapted to cooperate with its respective cam element 88, which cam elements are secured at correspondingly spaced apart intervals to the shaft 90 installed in the extensions 18 of the frame. These cams may be secured to the shafts in any desired manner, pins 92 having been illustrated for this purpose. One extremity of the shaft 90 is provided with a pinion 94 through which the shaft is driven in a manner hereinafter described.

A pair of guide pins 96 and 98 is associated with each of the plungers 78 and are supported by the guide block 80 as illustrated in Figs. 4 and 5. These guide pins are adapted to cooperate with a pin 100 extending laterally through each of the plungers 78. A collar 102 abuts each of the pins 100 and forms a seat for one extremity of a coil spring 104 which surrounds each of the plungers 78. The other extremity of each coil spring is adapted to seat against the mold block 72, the resulting tendency being to constantly force the plunger out of the mold cavity 74 and maintain a constant contact between the roller 86 and its cam 88.

A single prime mover, here shown in the form of an electric motor 106, is adapted to actuate all the movable elements of my improved machine. For this purpose I have provided a V-shaped bracket 108 supported upon the outer side of wall 14 between the arms of which is journalled a shaft 110. This shaft is provided with a worm 112 in its central portion which is adapted to mesh with the gear wheel 50. The outer extremity of shaft 110 is provided with a pulley wheel 114 through which the shaft is driven by the motor 106. Upon the outer extremity of shaft 48, outside the wall 14, is secured a pinion which is constrained to rotate with the shaft as the gear wheel 50 is rotated. A link chain 116 connects the said poinion with the pinions 54 and 94 for the purpose of rotating the agitating elements in the secondary mixing chamber 28 and the actuating cams 88 which function to drive the ejection plungers 78.

Another feature of importance resides in the adjustment provided to regulate the size of the molded products. This is accomplished by use of the adjustment rods 122 having a connection by adjustable nuts 124 and 126 with guide block 80 and secured at the opposite end to the wall of the mold box. The guide block 80 has a slidable engagement at each end between bars 82 and 84 so that the nuts on the rods 122 can be adjusted to move the block toward or away from the mold box to regulate the projection of the end of the plunger into the mold cavity to control the amount of candy permitted to enter the mold cavity. By moving the guide block toward the mold box the plungers enter further into the mold cavities and reduce the size of the mold cavities.

The operation of the device will be clear from the foregoing description. The various ingredients of which the particular confectionery is to be formed are deposited through the chute 24 into the primary mixing chamber 20. The partition member 38 being in position, the motor 106 is started and the agitating elements in the primary mixing chamber function to thoroughly stir the ingredients for the purpose of forming an agglomerate mass. After the ingredients have been stirred to the proper consistency in the primary mixing chamber the partition 38 is removed and the agglomerate is permitted to drop through the opening formed thereby into the secondary chamber 28. Here it is subjected to a further stirring action for the purpose of more thoroughly mixing the ingredients. The agglomerate, through the action of gravity and the movement imparted to it by the revolving agitating elements, will drop through the opening 70 into the mold cavities 74. During the time the agglomerate is being discharged from the lower chamber, a second batch of ingredients is placed in the upper chamber, the partition having been reinserted, and is there mixed.

An important feature of the invention resides in the fact that the movement of the wiper blades 58 in the secondary chamber 28 is so correlated to the movement of the ejection plungers 78 that each plunger is forced outwardly to eject that portion of the agglomerate which has settled within the mold cavity at the same time that a wiper blade is passing over the said cavity. In other words, the agglomerate first forms in the mold cavity without any direct forcing action, after which the wiping blade and the plunger travel simultaneously across the opening 70 in the mixing chamber to cut away a cleanly molded candy formation and eject it from the machine. If it were not for the simultaneous movement of the plunger and the wiper blade the agglomerate deposited in the mold cavity might tend to draw with it additional agglomerated substance as it was being ejected, or it might eject some of the agglomerate back into the mixing chamber and thereby produce candy particles of varying size. In other words, the wiper blade seals the mold cavity at the instant of ejection of the molded product so that the molded products are maintained at a uniform size.

Another feature of this invention, and one which greatly facilitates the speed of operation and the general utility of the mechanism as a whole, resides in the provision of a receiving slab 118 upon which the molded products fall upon their ejection from the mold cavities. This slab may be supported between the upright walls 14 and 16 in any suitable manner and is spaced above the central seating portion 12 of the base 10 as illustrated in Fig. 1. A continuous belt 120 is arranged to pass under the slab 118 and the operator may transfer the ejected products from the slab 118 to the supporting belt 120 as rapidly as the candy is ejected. The belt will transfer the finished product to the wrapping department or any other desired place.

Having illustrated a preferred form of my invention various modifications will be apparent to those skilled in the art and for that reason I wish to limit myself only within the scope of the appended claims.

What I claim is:

1. A candy mixing machine comprising a pair of adjacent mixing chambers, a removable partition between the two, agitating elements operable within each of the chambers, a plurality of mold cavities associated with the wall of one of said chambers, and horizontally reciprocable means associated therewith for ejecting the candy products formed therein.

2. A candy molding machine including, in combination, a mixing chamber, spaced apart agitating elements positioned therein and including alternately opposed portions adapted to wipe the wall of said chamber, mold cavities associated with said wall and opening therethrough, and means associated with said cavities for ejecting the candy products formed therein.

3. In a candy making machine, a mixing chamber, agitating elements adapted to wipe the inner surface wall thereof, a mold block forming a portion of the wall of said mixing chamber and including a plurality of mold cavities, ejection mechanism associated with said cavities, and means coupled with said agitator actuating means for automatically actuating said ejection means synchronously with said agitating means as each of the latter moves across a mold cavity.

4. In combination with a mixing chamber, a plurality of agitating elements positioned therein and including a wiper blade adapted to wipe the inner surface of said chamber, a plurality of mold cavities opening into the interior of said chamber, ejection means associated with each of said mold cavities, and mechanism operable through a single power source to actuate each of said ejection means respectively as one of the wiper blades passes over the mold cavity.

5. A candy making machine having a mixing chamber provided with a mold cavity directly communicating therewith to receive candy therefrom, and a wiper blade supported within the mixing chamber to wipe the entire wall thereof and arranged to pass over the communicating opening into the mold cavity.

6. A candy making machine having a mixing chamber provided with a mold cavity communicating therewith through an opening in the wall of the chamber, an ejector to eject the molded candy from the cavity, a wiper blade within the mixing chamber adapted to traverse the wall of the chamber and pass over the opening into the mold cavity, and mechanism coordinating the movement of the ejector and wiping blade so that the wiper blade passes over the opening in the cavity at the time the ejector is ejecting the molded product from the cavity.

7. Mechanism of the class described including, in combination, a cylindrical mixing chamber, a wiper blade rotatably mounted therein and arranged to wipe the inner wall thereof, a mold cavity positioned in contiguous relation to said chamber and communicating with the interior of the chamber in the path of said wiper, an ejector element slidable within said cavity, and synchronized means for actuating said ejector element and wiper blade to remove the substance deposited in the mold cavity simultaneously with the passage of the wiper thereover.

8. A candy making machine comprising, in combination, a mixing chamber having a mold cavity formed in its wall, an ejector adapted to eject the molded product from said cavity, means arranged within the mixing chamber coordinated in movement with said ejector to traverse the opening from the chamber into the mold to assist in severing the product in the mold from the product in the mixing chamber simultaneously with the movement of the ejector through the mold.

9. A candy making machine comprising, in combination, a cylindrical mixing chamber, a plurality of mold cavities formed as a part of the wall of the chamber each opening into the mixing chamber, a plurality of plungers to eject the molded product from each mold, a plurality of wiper blades arranged within the chamber adapted to traverse the opening into each mold, mechanism driving said plungers and wiper blades in coordination whereby as each plunger is driven through the mold to eject the molded product therefrom the corresponding wiper blade is caused to traverse the opening from the chamber into the mold simultaneously with the movement of the plunger therethrough.

JAMES N. KALKANIS.